Figure 1:
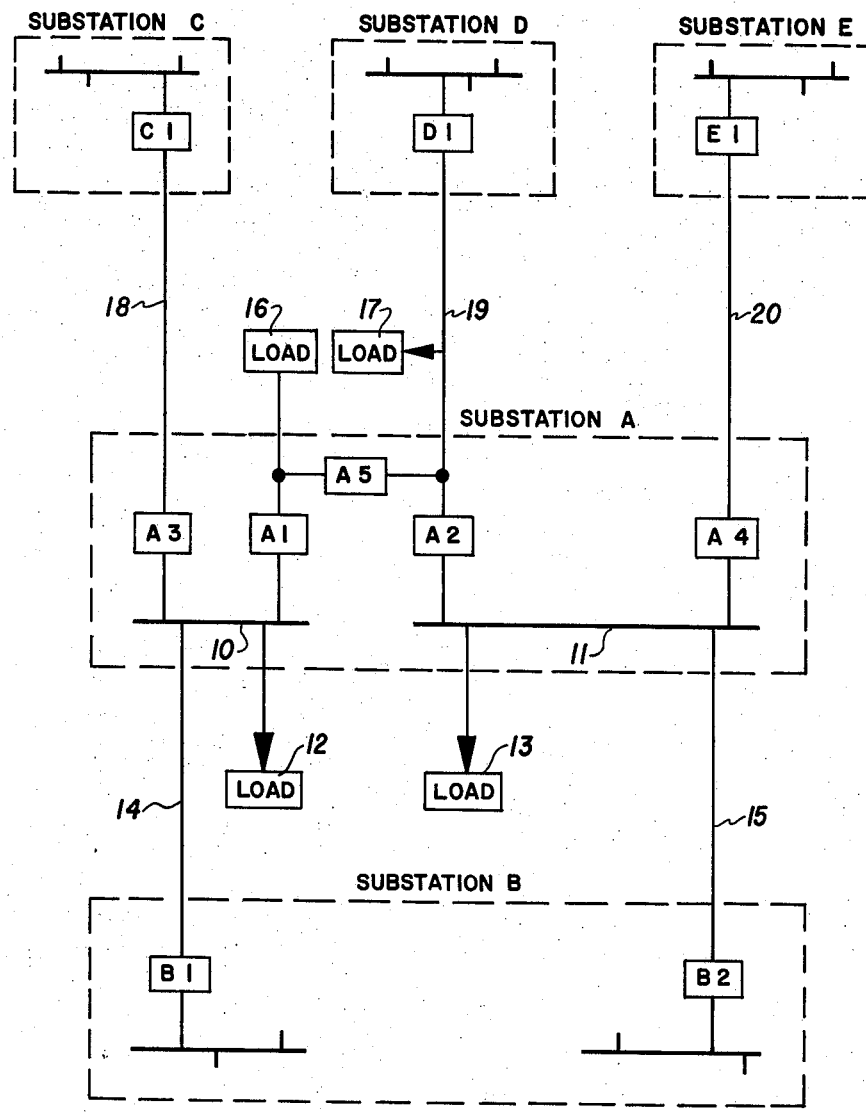

United States Patent Office 3,144,585
Patented Aug. 11, 1964

3,144,585
LOGIC CONTROL SYSTEM FOR ELECTRICAL
POWER TRANSMISSION NETWORK
John W. Blakemore, Dallas, Tex., assignor to Texas
Instruments Incorporated, Dallas, Tex., a corporation
of Delaware
Filed May 22, 1962, Ser. No. 196,809
6 Claims. (Cl. 317—28)

This invention relates to a system for controlling the breakers in a substation of an electrical power transmission network.

There are two entirely different types of electrical faults in a transmission system. They are (1) short circuit faults of one phase to ground, or of one phase to another, and (2) open circuit faults where the conductor of one phase opens but does not make electrical contact with ground or with another phase. The control logic of this invention is concerned only with the first type of fault, since open-circuit faults are highly improbable events and techniques presently used for detecting such faults are generally satisfactory.

The short-circuit fault can be detected in several ways. If the fault is close to the detector, a large drop in voltage will be noted—the voltage close to the fault drops to zero. However, since the generators have low transient impedances, the voltage rises rapidly to an almost normal level as one moves away from the fault. Whether the fault is close or not, the current in the faulted line will increase greatly. Therefore, if the fault is not cleared very quickly, the excessive current will damage lines and transformers.

The low resistance and relatively high inductance of the transmission lines furnish the basis for one way of detecting faults. A fault detector "looking" through a transmission line at the load normally "sees" the high resistance of the load. The combination of the transmission line and the customer load usually results in the current lagging the voltage by 15 to 20°, with occasionally values as low as 5° or as high as 40°. Whenever a short-circuit fault occurs, the detector on a transmission line is isolated electrically from the load and now "sees" primarily (or exclusively) the transmission line impedance with its large lagging phase angle. Therefore, a phase angle threshold detector which senses the change of phase angle to a lagging value of greater than perhaps 50° would detect faults. The direction of the fault, of course, will also be detected.

There is one anomalous condition that could cause trouble when using phase angle detectors exclusively. At some point along a transmission line between two generators, it is conceivable that the real power flow could be very small or even zero. If the real loads along such a line were exactly balanced, the generator at one end would feed only the load on its half of the line and the generator on the other end would feed the load on its end exclusively. There would then be no real power flow at the center of the line. If at the same time the reactive loads were not balanced between the two halves of the line, there would be a large phase angle for the reactive power flow at the center, so that a simple phase detector at the center would mistakenly think there was fault current. However, this unusual condition will always be accompanied by a relatively low current. The phase angle detector could then distinguish a real fault by having a current detector in series. While this current detector is not shown in the illustrative embodiment below, it would probably be necessary that all phase detectors have this current-sensitive relay.

It is important to note that the phase angle sensor is not affected by distance to the fault. As long as the detector is in the path of power flow to the fault, a large lagging phase angle will be detected. Even if a real load is tapped off the transmission line between the detector and the fault, the phase angle will be roughly the same. The fact that the phase angle detector "sees" the adjacent substation and beyond is very important to the control logic of this invention.

The basic idea behind the control logic of this invention is that the total information available at a substation with a plurality of breakers is far greater than is available at any one breaker. It is proposed to feed all the information available at a substation into a logic arrangement and then have all control signals to open breakers come out of the logic network, using all pertinent information to open any one breaker rather than only that available at the breaker.

It is impractical with present-day devices to devise a control system in which each substation works independently. When phase angle detectors are used, no distance information is available. Also, it is sometimes necessary for one substation to back up another substation whose breakers have failed to operate correctly. The result is that in any control system some information must be transferred between substations to protect transmission lines that connect the substations. Only very limited information need be transferred so that a complex telemetry system is not required. At present, almost every substation with breakers is equipped with a carrier tone system to send high frequency tones (50–200 kc.) over the transmission lines and it is contemplated that this conventional equipment be used in the present invention.

It is the principal object of this invention to provide an improved breaker control system for a substation in an electrical power transmission network. Another object is to provide a breaker control system which uses only phase angle detectors to determine line faults. An additional object is to provide an improved back-up arrangement for operating other breakers in a substation or in a distribution system when one breaker fails to operate. A further object is to provide a breaker control arrangement which utilizes all of the available information in the system to determine which breakers should be opened.

Figure 2:
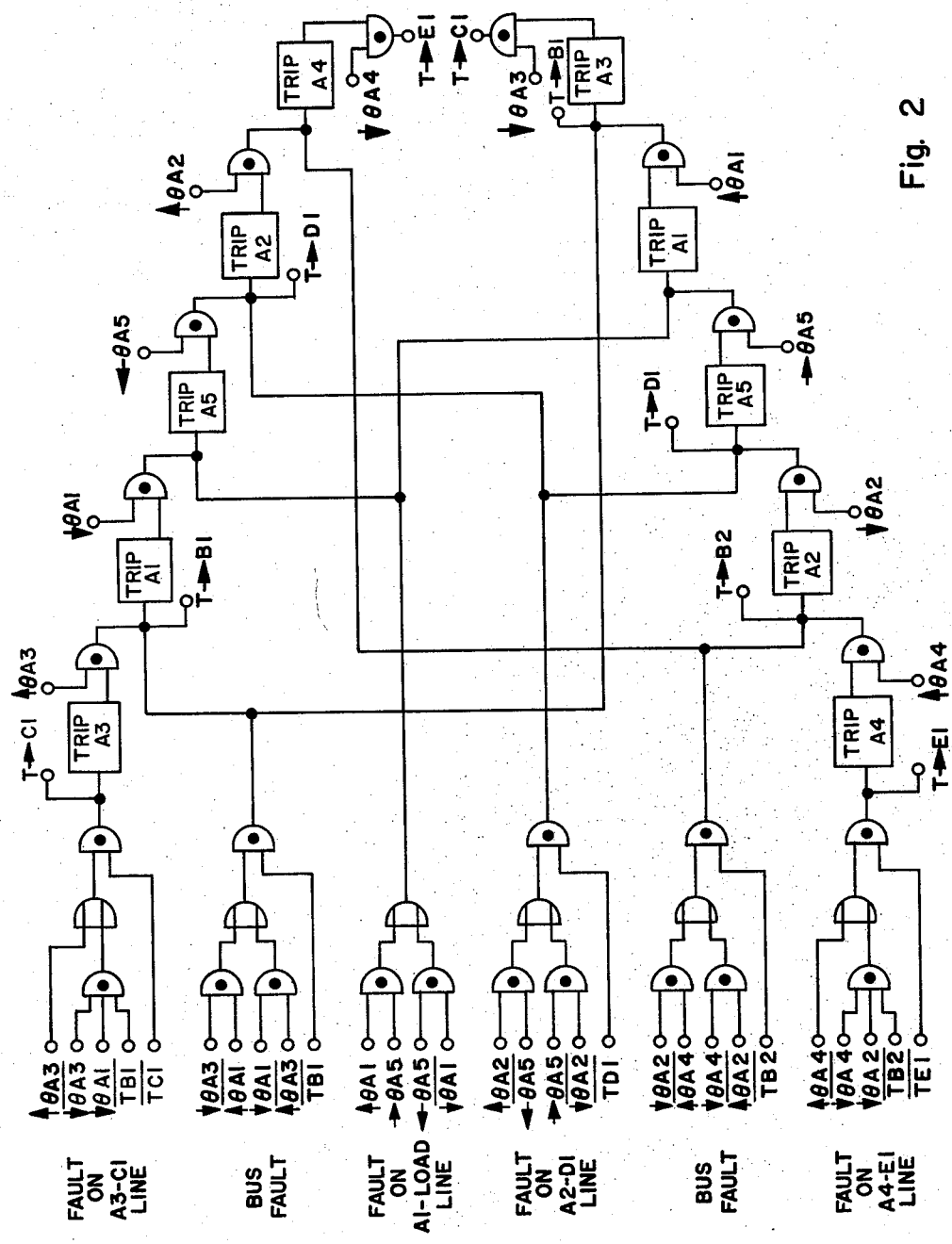

The novel features believed characteristic of this invention are set forth in the appended claims. The invention itself, however, along with further objects and advantages thereof, will best be understood by reference to the following detailed description of an illustrative embodiment, when read in conjunction with the accompanying drawing, wherein:

FIG. 1 is a block diagram of a typical segment of a power distribution system including several substations; and FIG. 2 is a logic diagram of a breaker control system for one of the substations in FIG. 1 utilizing the principles of this invention.

To demonstrate the type of approach advocated, an illustrative substation was selected, this being the substation A in FIG. 1, and a logic system for controlling the breakers in this substation is represented with reference to FIG. 2. It should be noted that there are many ways in which the total information on faults can be processed in order to determine which breakers to open or close. The illustrative embodiment of the invention described below is not to be considered limiting. There is some redundancy in the information available, and various ways may be devised to utilize this redundancy to best advantage.

With reference to FIG. 1, a segment of a power transmission network is shown which includes the substation A having five breakers A1–A5. The substation A includes two bus bars 10 and 11, each being directly connected to one of a pair of loads 12 and 13 with no breakers interposed. Each bus is also connected by a line 14 or 15 to a similar bus in a substation B, breakers B1 and B2 being used at this latter substation. Various other connections which would be made to the buses in substation B have been omitted for simplicity. The buses 10 and 11 are further connected to a pair of loads 16 and 17 through the breakers A1 and A2, while the breaker A5 connects the lines outside these breakers. The bus 10 is further connected through a line 18 to a bus in a substation C which may, but does not necessarily, include a breaker C1 in the line. The bus 11 is connected through breakers A2 and A4, and lines 19 and 20, to further substations D and E, respectively. These substations may include breakers D1 and E1 between the lines 19 and 20 and the appropriate bus bars. All of the transmission lines 14, 15, 18, 19 and 20 may have loads tapped off at many points along their length. Power from the system generators may be supplied from either end, or from all terminations of the FIG. 1 system.

Each of the breakers in FIG. 1 would have associated therewith phase detection means of conventional form adapted to produce a signal output representing the presence and absence of fault current through the breaker in both directions. This may include two phase detector circuits, each driving a flip-flop. The particular form of the phase detectors used is not part of this invention and so will not be described in detail. Each breaker would also have means to transmit a signal to one or more of the other substations indicative of whether the breaker has been instructed to close. This latter operation can be provided by conventional carrier current telemetry which is presently used, and so will not be described in detail.

With reference to FIG. 2, an illustrative logic system for controlling the breakers in the substation A is shown in logic diagram form for simplicity. A notation system was adopted for the logic fan-ins which may be readily understood by considering several examples. The legend ($\uparrow \theta A3$) means that at breaker A3 phase angle fault current has been detected in the upward direction or with power flowing from the bus bar 10 to the line 18. When this condition is present, a voltage is applied to the terminal adjacent this legend at all places that it appears in FIG. 2. In a like manner, the legend ($\overline{\uparrow \theta A3}$) means that there is an absence of fault current in the upward direction through the breaker A3, and a voltage is applied to the terminal adjacent this legend whenever it appears in FIG. 2.

When there is an excessive lagging phase angle detected at B1 with power flow in a downward direction, the fault is obviously below this point. However, ($\downarrow \theta A1$) and ($\downarrow \theta A3$) would also be detected, whereas there is no necessity for opening the breakers A1 and A3, assuming that B1 operates properly. Thus, when there is fault current down in B1, a "blocking" signal is sent by telemetry to substation A to prevent unnecessary operation of breakers. This blocking signal is indicated in FIG. 2 by the legend ($\overline{TB1}$), for example. The legend ($\overline{TB1}$) means the absence of a blocking signal from B1 or in other words that fault current from line 14 to the left bus in substation B is not present.

With the legend of FIG. 2 in mind, the logic used to trip the breaker A3, for example, may be readily understood. Assume that there is a ground fault on the line 18 between A3 and C1. Fault current upward in A3 will result in a ($\uparrow \theta A3$) indication, while the absence of fault current upward in C1 will produce a ($\overline{TC1}$) signal, the fault current in C1 being downward. With these two conditions present, the line entering the block "Trip A3" in FIG. 2 would be energized, through the appropriate OR and AND gates, thus instructing the breaker A3 to open the line. At the same time, a command signal would be sent by telemetry to C1, indicated in FIG. 2 by the legend (T→C1). This command signal would have the effect of instructing substation C to open C1, although corresponding portions of this operation are omitted from FIG. 2. If the fault detector which should produce ($\uparrow \theta A3$) did not operate, A3 would still be tripped by the presence of ($\overline{\downarrow \theta A3}$), ($\downarrow \theta A1$), ($\overline{TB1}$) and ($\overline{TC1}$), these four being connected to the two AND gates as seen in FIG. 2. An examination of FIG. 1 will explain why this should be true. If there is fault current downward in A1 but not downward in A3, and no fault current up in C1 or down in B1, the logical conclusion is that there is a fault in the line 18.

If there is a ground fault on the bus 10, the line 14, or the line going to the load 12, then A1 and A3 should be opened. As seen in FIG. 2, signals indicating ($\downarrow \theta A3$) and ($\uparrow \theta A1$), or ($\downarrow \theta A1$) and ($\downarrow \theta A3$), along with ($\overline{TB1}$), will energize the Trip A1 block in the upper chain and the Trip A3 block in the lower chain. The OR gate in this portion of the logic allows A1 and A3 to trip even though some of the fault current detectors on A1 and A3 are not operating.

Similarly, a ground fault on the bus 11, the line 15, or the load 13 will cause A2 and A4 to trip. The logic used to do this is the same as that associated with the bus 10 discussed above and is seen in FIG. 2 as the next-to-lowest group.

A fault on the line from A1 to the load 16 should cause A1 and A5 to open. This is implemented in the present invention by feeding ($\uparrow \theta A1$) and ($\rightarrow \theta A5$) into one AND gate, and ($\leftarrow \theta A5$) and ($\overline{\downarrow \theta A1}$) into another AND gate. The outputs of these gates are applied to an OR gate whose output energizes the Trip A1 and Trip A5 blocks. It is seen that the absence of downward fault current is utilized here, rather than the presence of upward fault current.

If there is a fault between A2 and D1 on the line 19, A2 and A5 are opened by the third-from-lowest logic group in FIG. 2. It is seen that ($\uparrow \theta A2$) and ($\overline{\leftarrow \theta A5}$), or ($\rightarrow \theta A5$) and ($\overline{\downarrow \theta A2}$), coupled with the absence of fault current upward in D1 represented by ($\overline{TD1}$), will energize the line which goes to the Trip A2 block in the upper chain and the Trip A5 block in the lower.

A fault on the line 20 results in tripping of A4, just as A3 is opened when the line 18 is grounded as discussed above. The logic arrangement for accomplishing this is seen in the lowest group in FIG. 2.

Thus far, only the initial line breaking functions have been discussed. If a breaker fails to operate, the system of this invention provides several stages of back-up action. Thus, a fault on the line 18 should result in tripping of A3, but if A3 does not open, ($\uparrow \theta A3$) will persist and this signal is seen to be fed to an AND gate at the right of the Trip A3 block in the upper chain. If the breaker A3 has been instructed to open by energization of its input line, but does not open, a signal will be applied after a short delay through the Trip A3 block to the other input to this AND gate, producing an output which energizes the Trip A1 block in the upper chain and sends a command signal (T→B1) to the substation B which has the effect of instructing B1 to open. If both A3 and A1 fail to trip, ($\downarrow \theta A1$) will persist, a signal will pass through the Trip A1 block to the AND gate to its right, and the Trip A5 block will be energized. Following the logic diagram on through, it is seen that if A3, A1 and A5 fail to operate when they have been energized, then A2 and D1 will be ordered to do so, and if A2 does not, A4 and B2 will be brought in.

Similar back-up action is provided for the remainder of the functions. A fault on the line 19, for example, should trip A5 and A2, but if not then A1 and A4 will be tried. If A1 does not trip then A3 will be energized. It is seen that all possible back-up breakers are used, and these are called upon not by fault current through the back-up breakers but instead by the same logic that ordered the primary breaker to function. That is, in the line 19 fault example, A3 is ordered to trip as a second stage back-up, not on the basis of detecting ($\downarrow\theta$A3), but instead on the same basis which was used to order A2 and A5 to trip.

If responsibility for back-up is passed on to B2, for example, and it also fails, a whole new chain of back-up is started in the substation B. It is seen that every breaker in the entire network can, if necessary, be called upon as back-up for every other breaker in the system.

While this invention has been described with reference to an illustrative embodiment, this description is not meant to be construed in a limiting sense. Various modifications of the invention may appear to persons skilled in the art upon reading this specification, and so it is contemplated that the appended claims will cover any such modifications as fall within the true scope of the invention.

What is claimed is:
1. A system for controlling a breaker of an electrical power transmission network comprising:
(a) a bus bar in a given substation,
(b) first, second and third distribution lines each connected at one end to a first, a second or a third other substation, respectively, and at the other end to said bus bar,
(c) first and second line breakers interposed between said bus bar and said first and second lines, respectively,
(d) means for detecting the presence of an excessive lagging phase angle of the power flow through said first breaker in a direction away from said bus bar and the absence of an excessive lagging phase angle through said first breaker in the other direction and to provide first and second electrical signals, respectively, upon the occurrence of such conditions,
(e) means for detecting the presence of an excessive lagging phase angle of the power flow through said second breaker in a direction toward said bus bar and to provide a third electrical signal indicative of such condition,
(f) means to provide fourth and fifth electrical signals at said given substation indicative of the absence of excessive lagging phase angles of power flow in directions away from said given substation at said first and third substations in said first and third lines,
(g) and control means in said given substation adapted to energize said first breaker upon the simultaneous occurrence of said second, third, fourth and fifth electrical signals.

2. Apparatus according to claim 1 further comprising:
(a) means for detecting the presence of an excessive lagging phase angle of the power flow through said first breaker in a direction toward said bus bar and to provide a sixth electrical signal indicative thereof,
(b) means for detecting the absence of an excessive lagging phase angle of the power flow through said first and second breakers in a direction away from said bus bar and to provide seventh and eighth electrical signals, respectively, indicative thereof,
(c) further control means in said given substation adapted to energize said first and third breakers upon the simultaneous occurrence of said fourth, fifth and sixth electrical signals and upon the simultaneous occurrence of said third, fourth and seventh electrical signals.

3. Apparatus according to claim 2 further including:
(a) a third line breaker in said given substation between said second breaker and said second transmission line,
(b) a fourth distribution line having one end connected between said second and third breakers, (c) means for detecting the presence of an excessive lagging phase angle of power flow through said second and third breakers in a direction away from said bus bar and to provide eighth and ninth electrical signals, respectively, indicative thereof,
(d) means for detecting the presence of an excessive lagging phase angle of power flow through said third breaker in a direction toward said bus bar and to provide a tenth electrical signal indicative thereof,
(e) means for detecting the absence of an excessive lagging phase angle of power flow through said second breaker in a direction toward said bus bar and to provide an eleventh electrical signal indicative thereof,
(f) additional control means in said given substation adapted to energize said second and third breakers upon the simultaneous occurrence of said eighth and ninth electrical signals and upon the simultaneous occurrence of said tenth and eleventh electrical signals.

4. Apparatus according to claim 3 further comprising:
(a) a second bus bar in said given substation,
(b) a fourth line breaker connected between said second bus bar and said second distribution line,
(c) means for detecting the presence of an excessive lagging phase angle of the power flow through said fourth breaker in a direction away from said second bus bar and to provide a twelfth electrical signal indicative thereof,
(d) means for detecting the absence of an excessive lagging phase angle of the power flow through said third breaker in a direction away from said second bus bar and to provide a thirteenth electrical signal indicative thereof,
(e) means for detecting the absence of an excessive lagging phase angle of the power flow through said fourth breaker in a direction toward said second bus bar and to provide a fourteenth electrical signal indicative thereof,
(f) means to provide a fifteenth electrical signal at said given substation indicative of the absence of an excessive lagging phase angle of power flow in a direction away from said given substation at said second substation in said second line,
(g) another control means in said given substation adapted to energize said third and fourth breakers upon the simultaneous occurrence of said twelfth, thirteenth and fifteenth electrical signals and upon the simultaneous occurrence of said ninth, fourteenth and fifteenth electrical signals.

5. Apparatus according to claim 1 further comprising:
(a) means for producing an electrical indication of a condition wherein said first breaker has been energized but has not opened said first line,
(b) and means for energizing said second breaker upon the simultaneous occurrence of said first electrical signal and said electrical indication.

6. Apparatus according to claim 3 further comprising:
(a) means for producing first and second electrical indications of conditions wherein said first and second breakers have been energized but have not opened said first and second lines, respectively,
(b) means for energizing said second breaker upon the simultaneous occurrence of said first electrical signal and said first electrical indication,
(c) and means for energizing said third breaker upon the simultaneous occurrence of said third electrical signal and said second electrical indication.

References Cited in the file of this patent
UNITED STATES PATENTS
2,879,454    Hodges et al. _____ Mar. 24, 1959
2,907,877    Johnson _____ Oct. 6, 1959